F. G. OLP.
FEEDER FOR CONCRETE MIXERS.
APPLICATION FILED SEPT. 25, 1908.
974,588.
Patented Nov. 1, 1910.
2 SHEETS—SHEET 1.
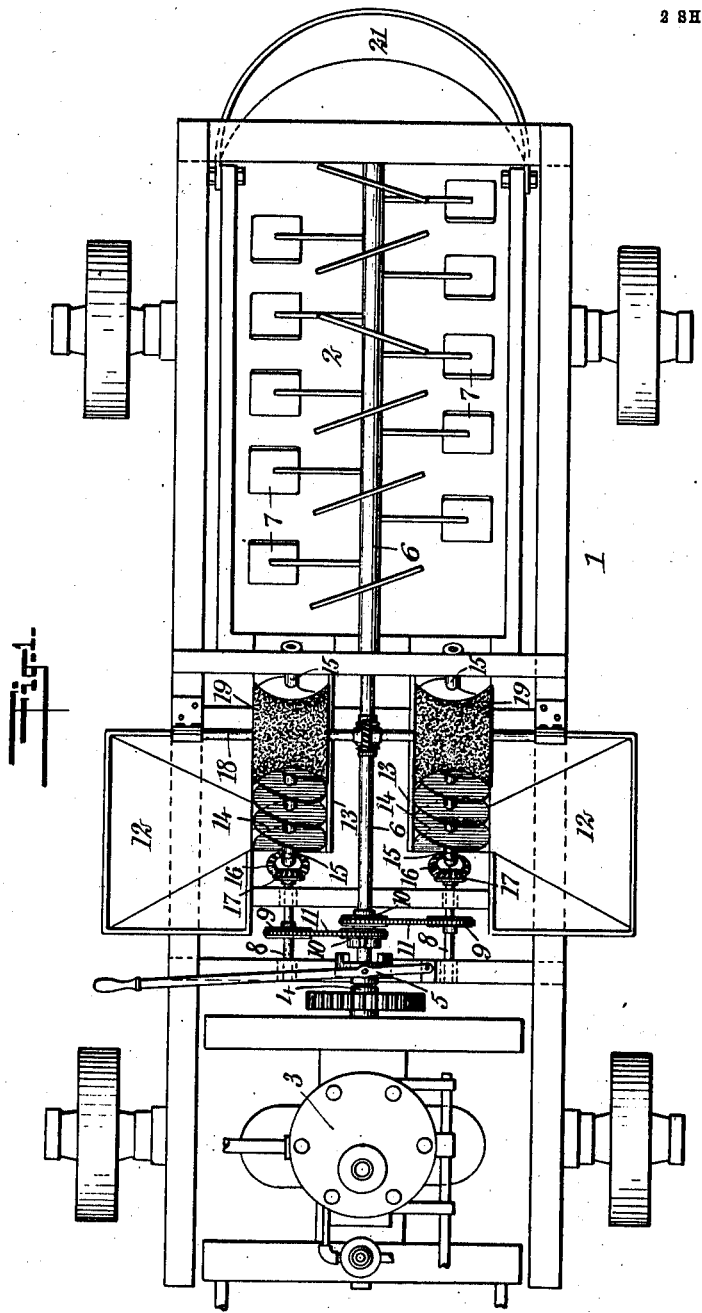
WITNESSES
F. G. Hackenberg
G. B. Marshall
INVENTOR
Fred G. Olp
BY Munn & Co.
ATTORNEYS F. G. OLP.
FEEDER FOR CONCRETE MIXERS.
APPLICATION FILED SEPT. 25, 1908.
974,588.
Patented Nov. 1, 1910.
2 SHEETS—SHEET 2.
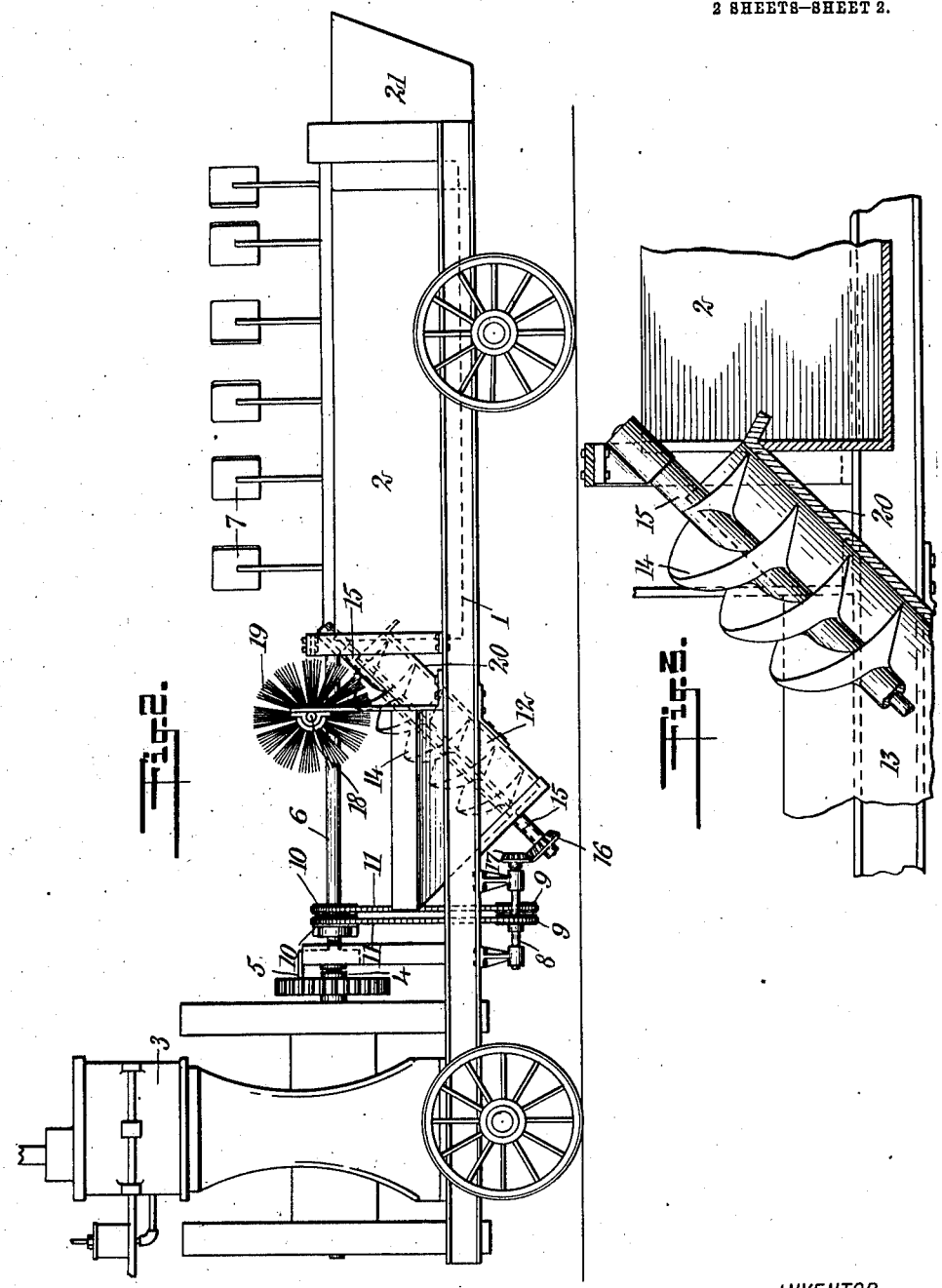
WITNESSES
J. G. Hackenberg.
G. B. Marshall
INVENTOR
Fred G. Olp
BY Munn & Co
ATTORNEYS

UNITED STATES PATENT OFFICE.

FRED G. OLP, OF NUNDA, NEW YORK.

FEEDER FOR CONCRETE-MIXERS.

974,588.   Specification of Letters Patent.   Patented Nov. 1, 1910.

Application filed September 25, 1908. Serial No. 454,687.

*To all whom it may concern:*

Be it known that I, FRED G. OLP, a citizen of the United States, and a resident of Nunda, in the county of Livingston and State of New York, have invented a new and Improved Feeder for a Concrete-Mixer, of which the following is a full, clear, and exact description.

The object of my invention is to provide a new and improved feeder for a concrete mixer, having a plurality of feed worms, which are adapted to convey the different ingredients from the several hoppers to the mixing drum, in predetermined proportions, there being a brush disposed over each of the worms to prevent surplus material from riding thereon.

Still other objects of the invention will appear in the following complete description.

I will describe the form of my invention which is shown in the drawings forming a part of this explanation the scope of the invention being defined in the appended claims.

Reference is to be had to the accompanying drawings, forming a part of this specification, in which similar characters of reference indicate corresponding parts in all the figures, in which—

Figure 1 is a plan view of the invention; Fig. 2 is a side elevation thereof, and Fig. 3 is an enlarged sectional view showing a feed worm disposed in a trough between a hopper and mixing drum.

By referring to the drawings, it will be seen that the concrete mixer is mounted on a wagon frame 1, but it will be understood that it may be secured to a floor or may be disposed in any other convenient manner. A mixing drum 2 is secured to the wagon frame 1 and a motor 3 is also disposed on the wagon frame 1. The shaft 4 of the motor is coupled to the shaft 6, the shaft 6 being disposed longitudinally of the wagon frame 1, and being suitably journaled so that it will extend longitudinally through the top of the mixing drum. To this shaft 6 are secured a plurality of paddles 7, the paddles 7 being disposed in the mixing drum 2. Two shafts 8 are journaled in bearings respectively at the bottom of the wagon frame 1, and to each of these shafts 8 is secured a sprocket wheel 9, similar sprocket wheels 10 being secured to the shaft 6, side by side, the sprocket wheels 10 being connected with the sprocket wheels 9 by sprocket chains 11, respectively. The sprocket wheels 10 are connected together, and by means of the clutch 5 they are thrown into engagement with the shaft 6 to rotate therewith.

At each side of the frame is disposed a hopper 12, to contain the materials which are to be mixed in the mixing drum 2, each hopper having a lateral extension 13, in which is disposed a feed worm 14, the feed worms 14 being mounted on shafts 15, which are disposed obliquely relatively to the wagon frame 1, and are journaled to the mixing drum 2 and to the bottom of the lateral extensions 13 of the hoppers 12. A bevel gear wheel 16 is secured to each of the shafts 15, these bevel gear wheels 16 meshing with bevel gear wheels 17 secured to the shafts 8. Each of the hoppers 12 has an inclined bottom leading to the bottom of the lateral extension 13, so that all the material in the hopper will flow toward the feed worms 14. At right angles to the shaft 6, and thereabove, is journaled a shaft 18, and the shaft 18 is connected with the shaft 6 by gearing a gear wheel 30 on the shaft 18 meshing with a gear wheel 31 on the shaft 6, so that the shaft 18 will be rotated at right angles to the shaft 6. Secured to the shaft 18 are two brushes 19, the brushes being disposed over the feed worms 14, and the periphery of each brush being concave transversely so that it may lie close to the feed worm 14. Troughs 20 connect the lateral extensions 13 with the mixing drum 2, the troughs 20 being disposed beneath the feed worms 14. At the rear of the mixer is pivoted a tailpiece 21, which is adapted to close the end of the mixing drum, but which may be lifted when desired to permit the concrete to flow from the mixing drum.

In using my invention, the sprocket wheels 9 and 10 are selected as to their size relatively to each other, in order that the feed worms may be rotated relatively to each other at a suitable speed to feed the different materials into the mixing drum in predetermined proportions. The materials are then deposited in the hoppers 12 respectively, the engine is started to cause the shaft 6 to rotate, which operates the paddles 7 in the mixing drum 2, and by operating the clutch 5 the sprocket wheels 10 and 9, connected by the sprocket chains 11, cause the rotation of the feed worms 14. At the same time the shaft 18 is rotated by means of the gearing by which it is connected with the shaft 6, thereby rotating the brushes 19. The materials are fed by the feed worms 14, up the inclined chutes 20, into the mixing drum 2, but by means of the brushes 19, any undue flow of the materials by the feed worms 14 is prevented. When it is desired to remove some of the concrete from the mixing drum, the tailpiece 21 is lifted to permit the concrete to flow either to the ground or into a receptacle suitably disposed.

It will be seen that by means of my machine, I may feed or measure a batch of materials into the drum, shut off the feed and mix the materials as a batch or run all the time and make the mix a continuous one; that is, the machine operates as a continuous mixer or a batch mixer as may be desired. It will further be seen that by placing the hoppers very low down or near the ground, greatly facilitates the supplying of the materials to the hoppers. It will also be seen that as the hoppers are considerably below the top of the mixing drum, the materials may be thrown into the hoppers from the ground, making it unnecessary to raise the materials to a considerable height in order that they may be thrown into the hoppers, as is the case with the concrete mixers now on the market.

Having thus described my invention, I claim as new and desire to secure by Letters Patent:

1. In a feeder for a concrete mixer, a hopper having a lateral extension, a trough which leads from the lateral extension, a feed worm disposed in the trough and having one of its terminals disposed in the lateral extension, a brush disposed across the feed worm, and means for operating the feed worm and the brush simultaneously.

2. In a feeder for a concrete mixer, two hoppers, chutes which lead into the hoppers respectively, feed worms disposed in the chutes respectively, means for rotating the feed worms, brushes disposed over each of the feed worms, the periphery of each brush being concave transversely, and means for rotating the brushes.

3. In a feeder for a concrete mixer, a feed worm adapted for raising material, a brush disposed thereover, with its axis substantially at right angles to the axis of the feed worm, and means for rotating the feed worm and the brush.

4. In a feeder for a concrete mixer, a feed worm, adapted for raising material, a brush disposed with its axis substantially at right angles to the axis of the feed worm, the periphery of the brush being concave transversely and which engages the feed worm, and means for rotating the feed worm and the brush.

5. In a feeder for a concrete mixer, a hopper, a chute which leads from the hopper, a feed worm mounted for rotating in the chute, a main shaft, a gear wheel thereon, a second shaft, a gear wheel on the second shaft which meshes with the gear wheel on the main shaft, a brush secured to the second shaft disposed across the feed worm, a shaft on which the feed worm is mounted, a gear wheel on the last-mentioned shaft, another shaft, a gear wheel thereon which meshes with the last-named gear wheel, sprocket wheels on the main shaft and the last-named shaft respectively, and a sprocket chain disposed on the sprocket wheels.

6. In a feeder for a concrete mixer, a hopper, a feed worm having its lower end disposed in the hopper, a main shaft, a second shaft, means for driving the second shaft from the main shaft, and a brush mounted on the second shaft disposed across and in contact with the feed worm.

In testimony whereof I have signed my name to this specification in the presence of two subscribing witnesses.

FRED G. OLP.

Witnesses:
F. D. OLP,
C. E. OLP.